United States Patent
Komai et al.

[11] Patent Number: 5,997,822
[45] Date of Patent: Dec. 7, 1999

[54] AMMONIA INJECTION DEVICE FOR USE IN EXHAUST GAS DENITRATION SYSTEMS

[75] Inventors: Masatoshi Komai, Higashi-Osaka; Nobuo Matsumoto, Kobe, both of Japan

[73] Assignee: Hitachi Zosen Corporation, Osaka, Japan

[21] Appl. No.: 08/915,580

[22] Filed: Aug. 21, 1997

[30] Foreign Application Priority Data

Aug. 22, 1996 [JP] Japan .................................. 8-220887

[51] Int. Cl.⁶ ........................... B01D 53/56; B01D 53/90
[52] U.S. Cl. ......................... 422/168; 422/172; 261/118
[58] Field of Search ................................. 422/197, 196, 422/176, 172, 168, 169; 110/345, 215; 423/239.1; 96/270, 273, 256, 260, 243, 280; 366/340, 337; 261/118

[56] References Cited

U.S. PATENT DOCUMENTS

| | | | |
|---|---|---|---|
| 5,173,093 | 12/1992 | Johnson et al. | 95/224 |
| 5,271,873 | 12/1993 | Nelson et al. | 261/116 |
| 5,435,976 | 7/1995 | Berner et al. | 422/168 |
| 5,543,090 | 8/1996 | Morton et al. | 261/118 |

*Primary Examiner*—Hien Tran
*Assistant Examiner*—Susan Ohorodnik
*Attorney, Agent, or Firm*—Armstrong, Westerman, Hattori, McLeland and Naughton

[57] ABSTRACT

An ammonia injection device for use in an exhaust gas denitration system comprises ammonia injection pipe units arranged in a multiplicity of stages within an exhaust gas duct and each comprising a horizontal header pipe and a plurality of ammonia injection pipes extending downward from and connected to the header pipe and each having a multiplicity of injection nozzles. The header pipes other than the uppermost header pipe and a guide fixing member disposed horizontally at a bottom portion of the duct are each provided with a plurality of upward tubular guides arranged at a predetermined interval. The injection pipes have their lower ends inserted in the respective guides upwardly and downwardly movably. The injection nozzles have an opening diameter gradually increasing as the injection pipe extends downward.

6 Claims, 4 Drawing Sheets

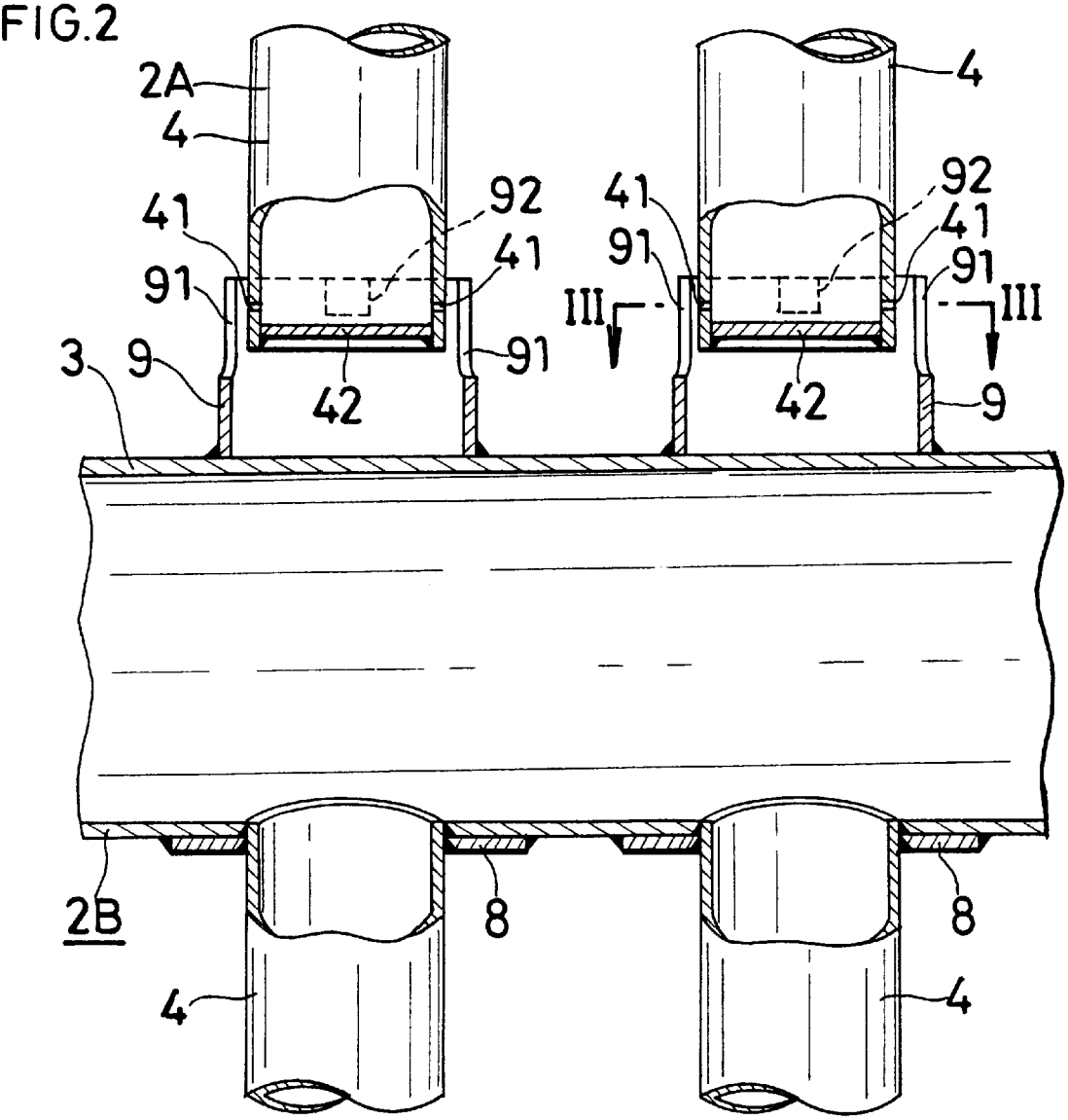
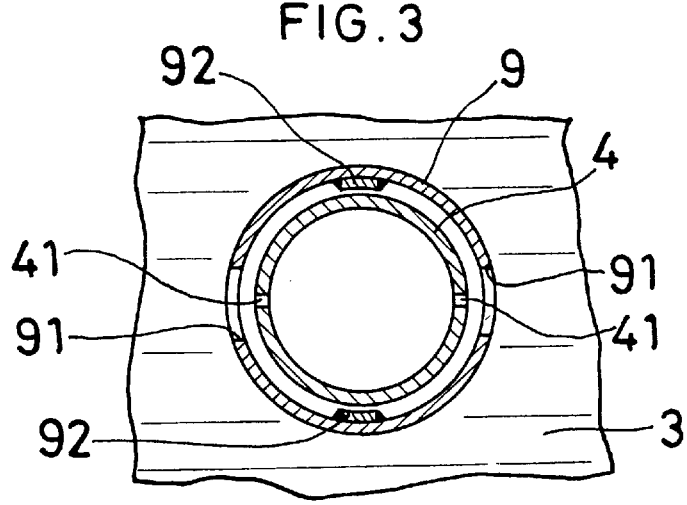

AMMONIA INJECTION DEVICE FOR USE IN EXHAUST GAS DENITRATION SYSTEMS

BACKGROUND OF THE INVENTION

The present invention relates to an ammonia injection device for injecting ammonia serving as a reducing agent into an exhaust gas duct, for use in exhaust gas denitration systems for removing nitrogen oxides (NOx) from the exhaust gases of gas turbines, boilers, etc. by selective catalytic reduction.

With reference to FIG. 6, exhaust gas systems include an ammonia injection device which is disposed within an exhaust gas duct provided between an NOx-containing exhaust gas source (boiler, heating furnace, gas turbine or the like) and a reactor. The injection device is installed at a specified position where the exhaust gas has an appropriate temperature for supplying to the duct vaporized ammonia gas serving as a reducing agent and supplied from an ammonia production device.

FIG. 7 shows a conventional ammonia injection device, which comprises a pair of vertical header pipes 201 arranged outside respective opposite side walls 101 of an exhaust gas duct 100, a plurality of ammonia injection pipes 202 arranged horizontally within the duct 100 with their opposite ends extending through the duct side walls 101 and each formed with a multiplicity of nozzles (not shown), and a plurality of expansion joints 203 connecting the ends of the injection pipes 202 to the header pipe 201 opposed thereto. The ammonia injection pipes 202 are secured to a plurality of vertical support members 204 arranged inside the duct 100 and thereby prevented from warping or deflecting.

However, the conventional ammonia injection device described has the following problems.

While the ammonia injection pipes 202 have opposite ends extending through the duct side walls 101, the provision of many pipe passing portions in the side walls 101 which portions need to be sealed makes the device complex in construction and requires much labor. Moreover, the multiplicity of expansion joints 203 must be used for absorbing the difference in the amount of thermal expansion between the injection pipes 202 which are exposed to the hot exhaust gas and the header pipes 201 which are positioned externally of the duct 101.

The amount of thermal expansion of the support members 204 increases considerably as the overall size of the device increases, so that the injection pipes 202 secured to these members 204 are likely to be broken by being subjected to pressure by the support members 204 which thermally expand.

The reducing agent, i.e., vaporized ammonia gas, needs to be uniformly injected into the duct 100, whereas when the ammonia injection pipes 202 have an increased length with an increase in the size of the device, there arises the problem that the device fails to effect uniform injection since the amount ammonia injected from the injection nozzle of the pipe 202 away from the header pipe 201 is much smaller than that from the injection nozzle close to the header pipe 201.

SUMMARY OF THE INVENTION

An object of the present invention is to overcome the foregoing problems.

The present invention provide an ammonia injection device for use in an exhaust gas denitration system which device comprises a plurality of ammonia injection pipe units 2A, 2B arranged in a multiplicity of stages within an exhaust gas duct 100 and each comprising a horizontal header pipe 3 and a plurality of ammonia injection pipes 4 extending downward from and connected to the header pipe and each having a multiplicity of injection nozzles 41, the header pipes 3 other than the uppermost header pipe 3 and a guide fixing member 5 disposed horizontally at a bottom portion of the duct 100 being each provided with a plurality of upward tubular guides 9 arranged at a predetermined interval, the injection pipes 4 having their lower ends inserted in the respective guides 9 upwardly and downwardly movably.

The ammonia injection device of the invention for use in an exhaust gas denitration system may alternatively comprise an ammonia injection pipe unit disposed within an exhaust gas duct and comprising a horizontal header pipe and a plurality of ammonia injection pipes extending downward from and connected to the header pipe and each having a multiplicity of injection nozzles, a guide fixing member being disposed horizontally at a bottom portion of the duct and provided with a plurality of upward tubular guides arranged at a predetermined interval, the injection pipes having their lower ends inserted in the respective guides upwardly and downwardly movably.

When the ammonia injection pipe units 2A, 2B are used each of which comprises a horizontal header pipe 3 and vertical ammonia injection pipes 4, only opposite end portions of the header pipe 3 need to be inserted through opposite sides walls of the duct 100. This makes the device simple in construction and easy to manufacture.

The header pipe 3 and the ammonia injection pipes 4 are all arranged within the duct 100, and there is no difference between the pipe 3 and the pipes 4 in the amount of thermal expansion. This eliminates the need to use expansion joints for connecting the header pipe to the ammonia injection pipes as in the prior art.

The ammonia injection pipes 4 have their lower ends upwardly and downwardly movably inserted in the respective upward guides 9 which are provided on each header pipe 3 other than the uppermost pipe 3 or on the guide fixing member 5 disposed horizontally at the bottom portion of the duct 100, so that the thermal expansion of the injection pipes 4 can be readily absorbed. Accordingly, there is no need to provide the support members used in the prior art. This obviates the likelihood that the injection pipes will break owing to the thermal expansion of the support members. Furthermore, the injection pipes 4 can be reliably prevented from deflecting by the guides 9.

With the ammonia injection device of the invention, the injection nozzles 41 of each injection pipe 4 have an opening diameter gradually increasing as the injection pipe extends downward.

This diminishes the difference between the amount ammonia injected from the nozzles 41 of the injection pipes 4 which nozzles are toward the upper end and close to the header pipe 3 and the amount of ammonia injected from the nozzles 41 toward the lower end and away from the header pipe 3. In the case where the injection pipes 4 have an increased length, therefore, vaporized ammonia can be injected into the duct approximately uniformly.

Further with the ammonia injection device of the invention, the injection pipes 4 are each provided at an intermediate portion of the length thereof with a flange 10 in the form of a horizontal plate, the flange being formed in each of opposite end portions thereof with holes 11 elongated longitudinally of the flange, the flanges 10 of each pair of adjacent injection pipes 4 being lapped over each other at the end portions and slidably connected together with bolts inserted through the elongated holes 11.

Even when the ammonia injection pipes 4 have an increased length, the flanges 10 as connected together serve as support members for the injection pipes 4, reliably preventing vibration of the pipes 4. When thermally expanding, the flanges 10 are slidable within the limits provided by the length of the elongated holes 11 against the frictional force of the bolts and nuts, whereby the problem of breakage is avoidable.

BRIEF DESCRIPTION OF THE DRAWINGS

FIG. 2 is an enlarged fragmentary view in vertical longitudinal section showing a header pipe at an intermediate portion of the height of the device of FIG. 1;

FIG. 3 is a view in section taken along the line III—III in FIG. 2;

DESCRIPTION OF THE PREFERRED EMBODIMENT

An embodiment of the invention will be described below with reference to the drawings.

Figure 1:
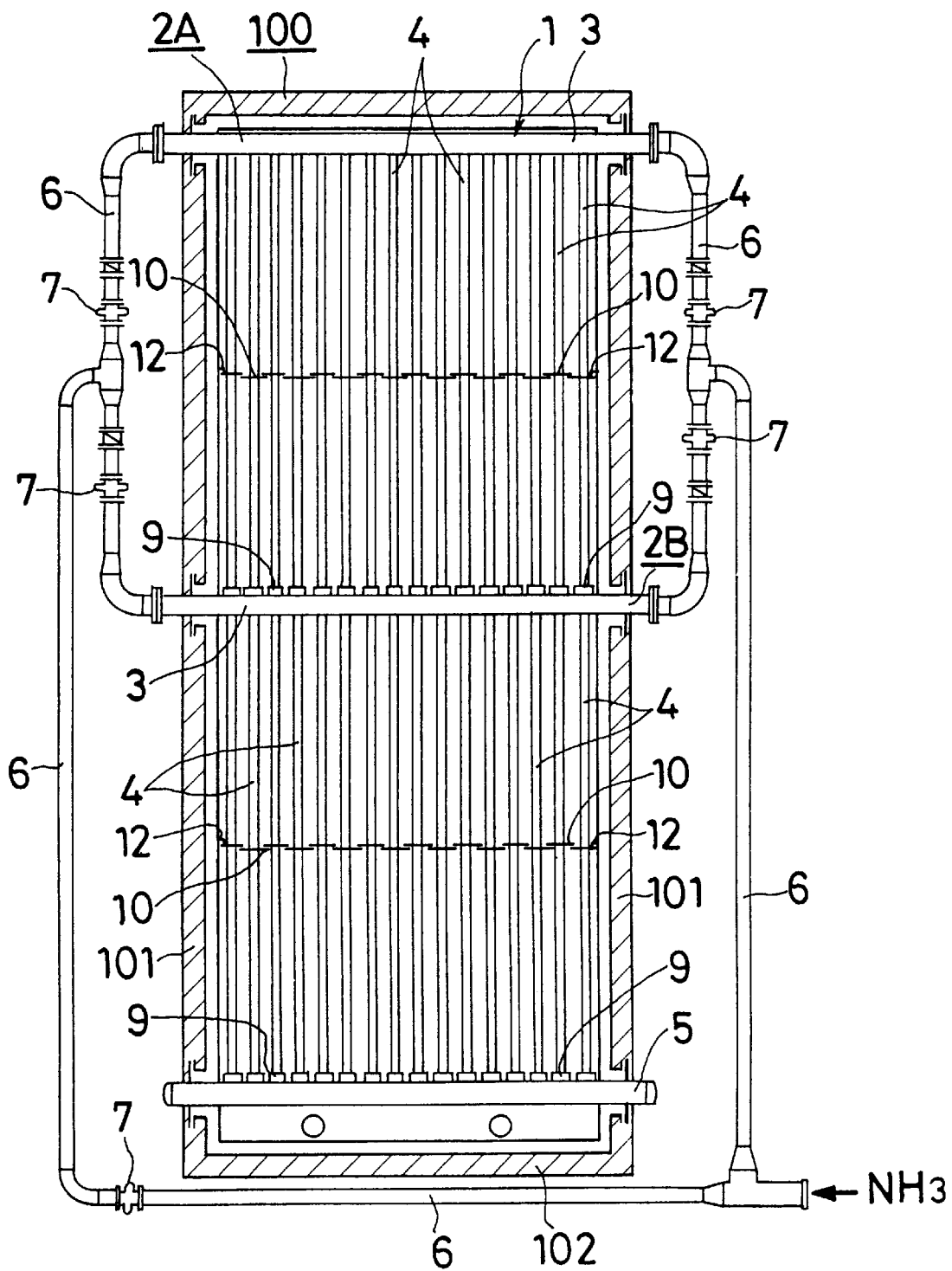
FIG. 1 is a front view of an ammonia injection device embodying the invention.
Figure 6:
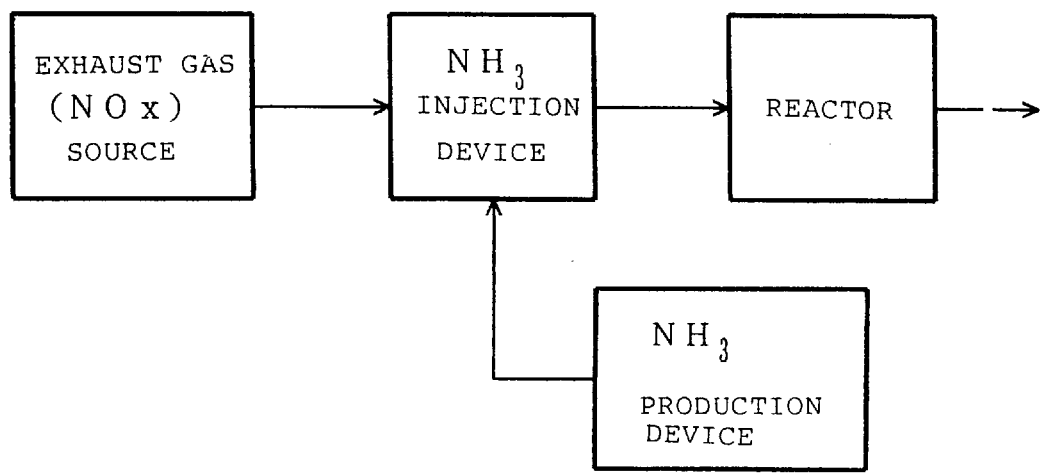
FIG. 6 is a flow chart schematically showing an exhaust gas denitration system.
Figure 7:
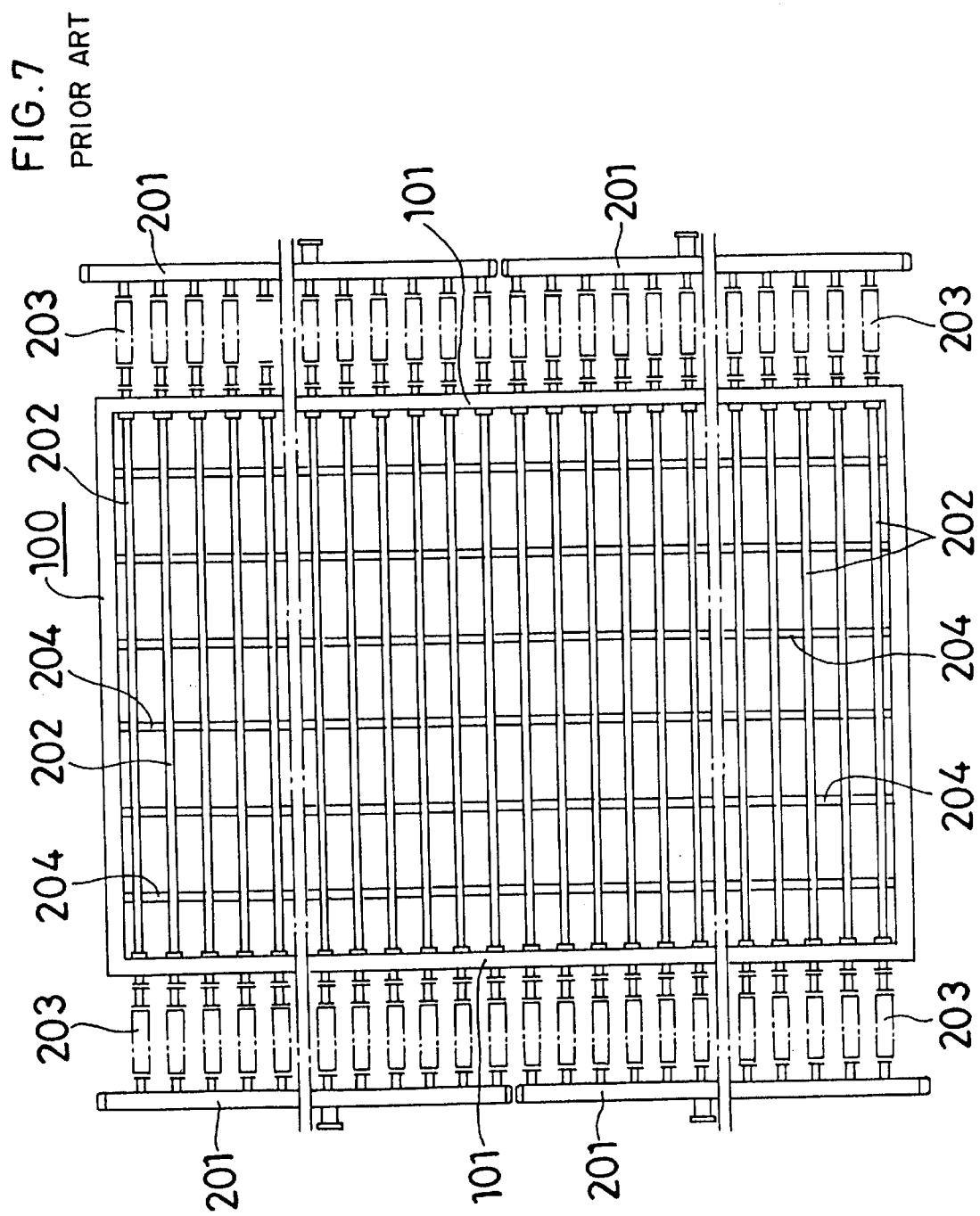
FIG. 7 is a front view showing a conventional ammonia injection device.

FIG. 1 is a view showing an ammonia injection device 1 of the invention in its entirety. The device 1 comprises two ammonia injection pipe units 2A, 2B arranged one above the other within an exhaust gas duct 100 (see FIG. 6) which is provided between an exhaust gas source, i.e., a gas turbine, and a reactor having a catalyst layer. The pipe units 2A, 2B each comprise a horizontal header pipe 3 and a plurality of ammonia injection pipes 4 extending downward from and connected to the header pipe 3.

Each of the header pipes 3 has opposite end portions extending through the right and left side walls 101 of the duct 100 to the outside. Each of the end portions of the header pipe 3 is connected to the outlet end of a branch of an ammonia supply pipe 6 disposed outside each side wall 101 of the duct. A plurality of expansion joints 7 are provided at required portions of the ammonia supply pipe 6.

With reference to FIG. 2, the upper ends of the ammonia injection pipes 4 are welded, each with use of a contact plate 8, to the lower side of the header pipe 3 of each of the upper and lower units 2A, 2B so as to communicate with the header pipe 3. The lower end of each injection pipe 4 is closed with a closure plate 42.

The ammonia injection pipe 4 is formed in its right and left side portions with a multiplicity of injection nozzles 41 in the form of circular holes and equidistantly spaced apart longitudinally thereof (see FIG. 2). Vaporized ammonia, i.e., ammonia gas, is supplied from an ammonia production device to the ammonia injection pipes 4 via the supply pipes 6 and each header pipe 3 and then injected into the duct 100 through the injection nozzles 41. The pitch of the nozzles 41, which is determined suitably, is usually about 20 mm.

The injection nozzles 41 have an opening diameter which gradually increases as the injection pipe 4 extends downward. This diminishes the difference between the amount of ammonia injected from the nozzles 41 of each injection pipe 4 which are toward the upper end and close to the header pipe 3 and the amount of ammonia injected from the nozzles 41 toward the lower end and away from the header pipe 3. The ammonia gas can therefore be injected into the duct 100 approximately uniformly. Although the ratio of increase in the opening diameter of the nozzles 41 is suitably determined, the diameter is increased usually by an increment of about 0.03 mm, for example, when the minimum opening diameter is 5.85 mm.

Disposed horizontally under the lower ammonia injection pipe unit 2B is a tubular guide fixing member 5 extending along the bottom wall 102 of the duct 100. The guide fixing member 5 has opposite end portions extending through the respective duct side walls 101 to the outside.

Upward tubular guides 9 equal in number to the number of ammonia injection pipes 4 of each of the units 2A, 2B are welded to the upper side of each of the header pipe 3 of the lower unit 2B and the guide fixing member 5. The guides 9 have an inside diameter slightly greater than the outside diameter. of the injection pipes 4. The ammonia injection pipes 4 have their lower ends inserted in the respective guides 9. The lower end of the injection pipe 4 is spaced apart from the upper side of the header pipe 3, as well as of the guide fixing member 5, by a small distance. Accordingly, even if the injection pipe 4 thermally expands longitudinally thereof, the lower end of the pipe 4 is movable downward inside the guide 9, whereby the thermal expansion can be absorbed. These guides 9 also prevent the injection pipes 4 from deflecting.

Each of the guides 9 is formed in the right and left side upper portion thereof with respective cutouts 91 so as not to interfere with the injection of ammonia gas from the nozzles 41 formed in the right and left side portions of lower end of the injection pipe 4 (see FIGS. 2 and 3). The guide 9 is further formed on the front and rear side upper portions thereof with inward projections 92 (see FIGS. 2 and 3). This diminishes the deflection of the injection pipe 4 in the longitudinal direction of the duct (i.e., in the direction of flow of the exhaust gas).

Figure 4:
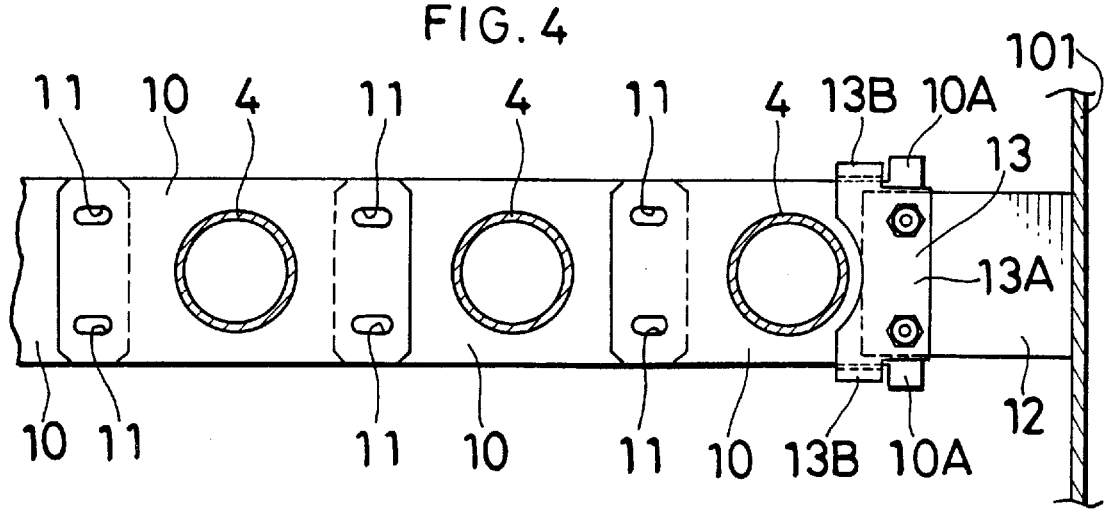
FIG. 4 is an enlarged view in horizontal section and showing ammonia injection pipes at an intermediate portion of the length thereof.
Figure 5:
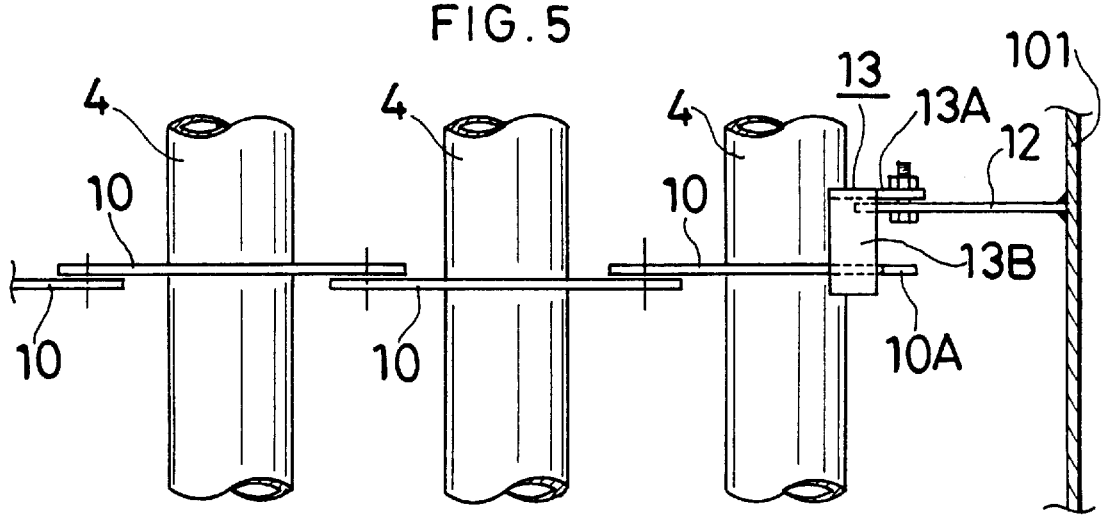
FIG. 5 is a front view showing lengthwise intermediate portions of the injection pipes on an enlarged scale.

FIGS. 4 and 5 show the lengthwise intermediate portions of some of the ammonia injection pipes 4 on an enlarged scale. A flange 10 in the form of a laterally elongated rectangular plate is fixed to each injection pipe 4. The flange 10 has a length slightly greater than the pitch of injection pipes 4. The flanges 10 of each pair of adjacent injection pipes 4 are lapped over each other at the end portions. The lapping end portions of the flanges 10 are formed at opposite sides with holes 11 elongated longitudinally of the flange 10 (see FIG. 4). Bolts (not shown) are inserted through the elongated holes 11 with nuts (not shown) screwed on the bolt ends. The nuts are tightened to such an extent that the flanges 10, when thermally expanding, are slidable within the limits provided by the length of the elongated holes 11 against the frictional force of the bolts and nuts. This eliminates the likelihood that the joint of the flanges 10 will break even when the flanges thermally expand. Depending on the length of the injection pipe 4, flanges 10 may be formed at a plurality of portions of the pipe 4 along the length thereof.

The flange 10 of the injection pipe 4 closest to each of opposite side walls 101 of the duct has engaging projections 10A formed respectively at opposite sides of the flange end closer to the wall 101. On the other hand, a flange connecting plate 12 projecting horizontally is welded to the duct side wall 101 at a portion thereof a small distance above the flange 10. A flange engaging member 13 generally inverted U-shaped when seen from one side has a horizontal mount portion 13A, which is attached to the free end of the plate 12 with two sets of bolts and nuts. The flange engaging member 13 has front and rear depending engaging portions 13B, which are engaged with the engaging portions 10A of the flange 10. Since the ammonia injection pipes 4 are nearly the same in the amount of longitudinal thermal expansion, the longitudinal expansion is unlikely to break the joints between the flanges 10, whereas if the flange 10 closest to the duct side wall 101 is fixedly connected to the plate 12 welded to the side wall 101, the connected portion and the welded joint between the plate 12 and the duct side wall 101 are likely to fracture. Use of the flange engaging member 13 described above renders the member 13 and the flange 10 slidable upward or downward relative to each other, whereby the thermal expansion of the injection pipe 4 can be absorbed, with the member 13 and the flange held in engagement, to obviate the likelihood of breakage.

What is claimed is:

1. An ammonia injection device for use in an exhaust gas denitration system, which device comprises a plurality of ammonia injection pipe units arranged one above the other within an exhaust gas duct, and each of said ammonia injection pipe units comprising a horizontal header pipe and a plurality of ammonia injection pipes extending downward from and connected to the header pipe, and each of said ammonia injection pipes having a multiplicity of injection nozzles, the header pipes, other than an uppermost header pipe and a guide fixing member disposed horizontally at a bottom portion of the duct, being each provided with a plurality of upward tubular guides, the injection pipes having their lower ends inserted in the respective guides so that their lower ends are upwardly and downwardly movable.

2. An ammonia injection device for use in an exhaust gas denitration system, which device comprises an ammonia injection pipe unit disposed within an exhaust gas duct and comprising a horizontal header pipe and a plurality of ammonia injection pipes extending downward from and connected to the header pipe, and each of said ammonia injection pipes having a multiplicity of injection nozzles, a guide fixing member being disposed horizontally at a bottom portion of the duct and provided with a plurality of upward tubular guides, the injection pipes having their lower ends inserted in the respective guides so that their lower ends are upwardly and downwardly movable.

3. An ammonia injection device as defined in claim 1 or 2, wherein the injection nozzles of each of the ammonia injection pipes have an opening diameter gradually increasing as the injection pipe extends downward.

4. An ammonia injection device for use in an exhaust gas denitration system, which device comprises a plurality of ammonia injection pipe units arranged one above the other within an exhaust gas duct, and each of said ammonia injection pipe units comprising a horizontal header pipe and a plurality of ammonia injection pipes extending downward from and connected to the header pipe, and each of said ammonia injection pipes having a multiplicity of injection nozzles, the header pipes, other than an uppermost header pipe and a guide fixing member disposed horizontally at a bottom portion of the duct being, each provided with a plurality of upward tubular guides, the injection pipes having their lower ends inserted in the respective guides so that their lower ends are upwardly and downwardly movable, wherein the injection pipes are each provided at an intermediate portion of the length thereof with a flange in the form of a horizontal plate, the flange being formed in each of opposite end portions thereof with holes elongated longitudinally of the flange, the flanges of each pair of adjacent injection pipes being lapped over each other at the end portions and slidably connected together with bolts inserted through the elongated holes.

5. An ammonia injection device for use in an exhaust gas denitration system, which device comprises an ammonia injection pipe unit disposed within an exhaust gas duct and comprising a horizontal header pipe and a plurality of ammonia injection pipes extending downward from and connected to the header pipe, and each of said ammonia injection pipes having a multiplicity of injection nozzles, a guide fixing member being disposed horizontally at a bottom portion of the duct and provided with a plurality of upward tubular guides, the injection pipes having their lower ends inserted in the respective guides so that their lower ends are upwardly and downwardly movable, wherein the injection pipes are each provided at an intermediate portion of the length thereof with a flange in the form of a horizontal plate, the flange being formed in each of opposite end portions thereof with holes elongated longitudinally of the flange, the flanges of each pair of adjacent injection pipes being lapped over each other at the end portions and slidably connected together with bolts inserted through the elongated holes.

6. An ammonia injection device as defined in claim 4 or 5, wherein the injection nozzles of each of the ammonia injection pipes have an opening diameter gradually increasing as the injection pipe extends downward.

* * * * *